United States Patent Office 3,703,382
Patented Nov. 21, 1972

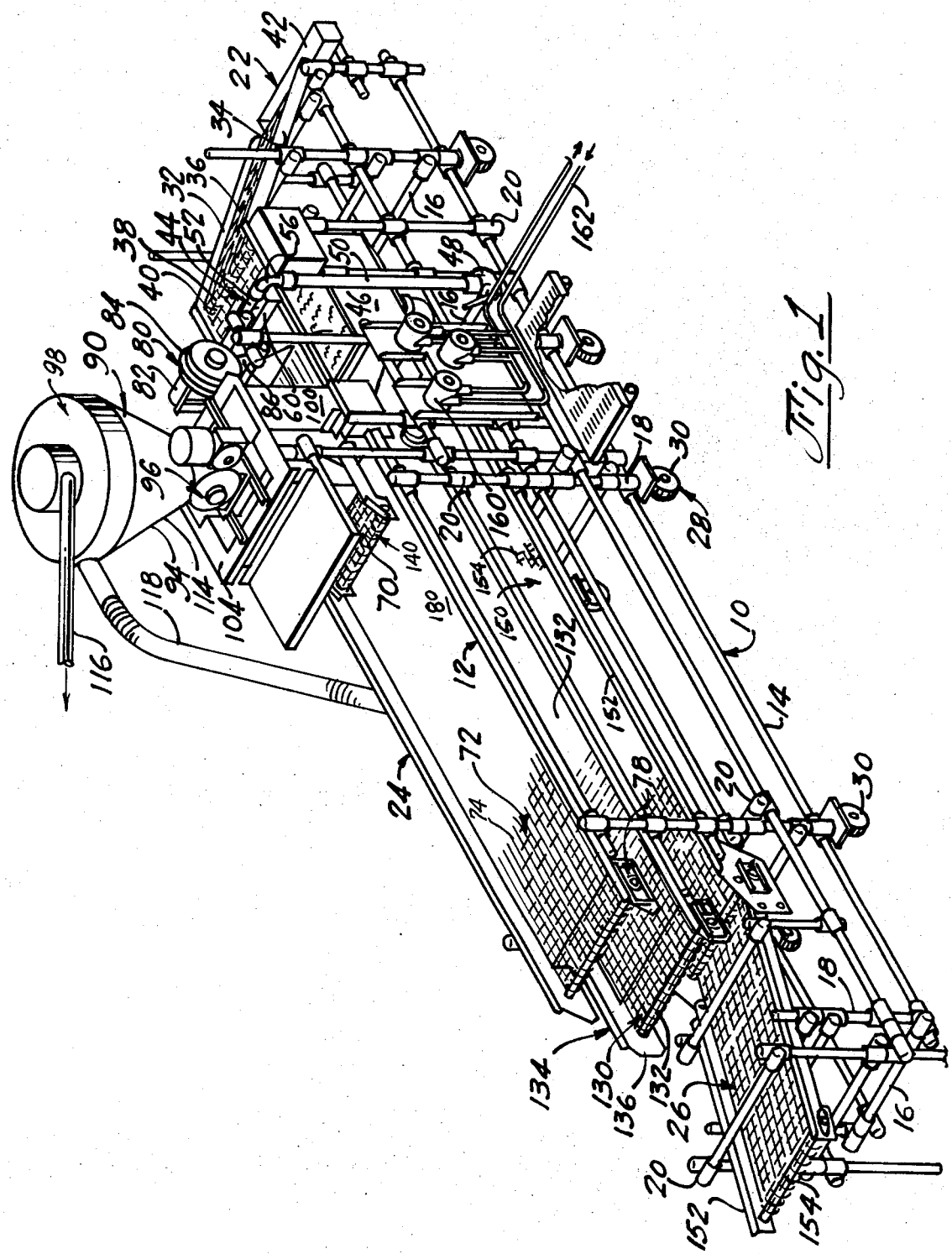

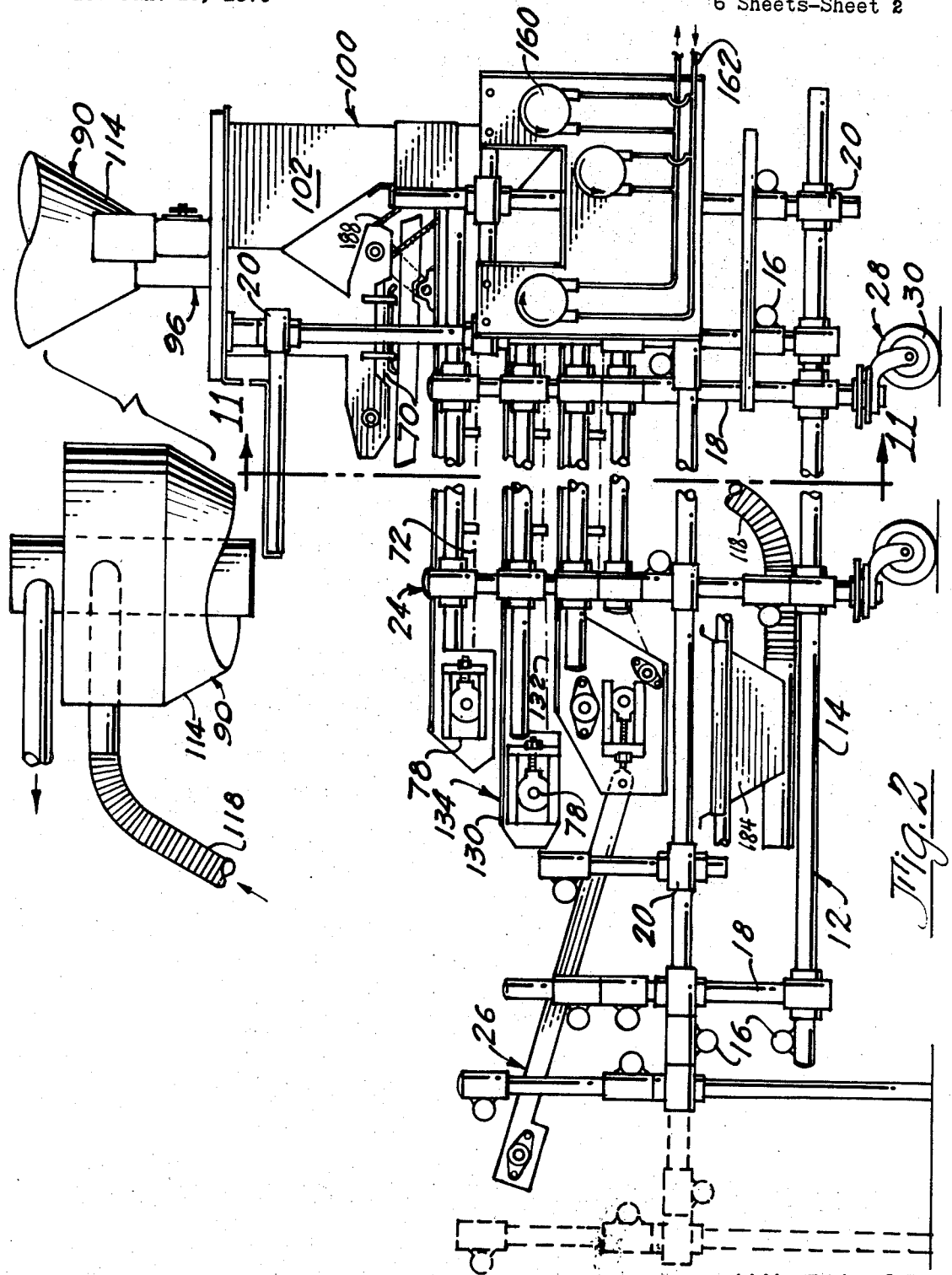

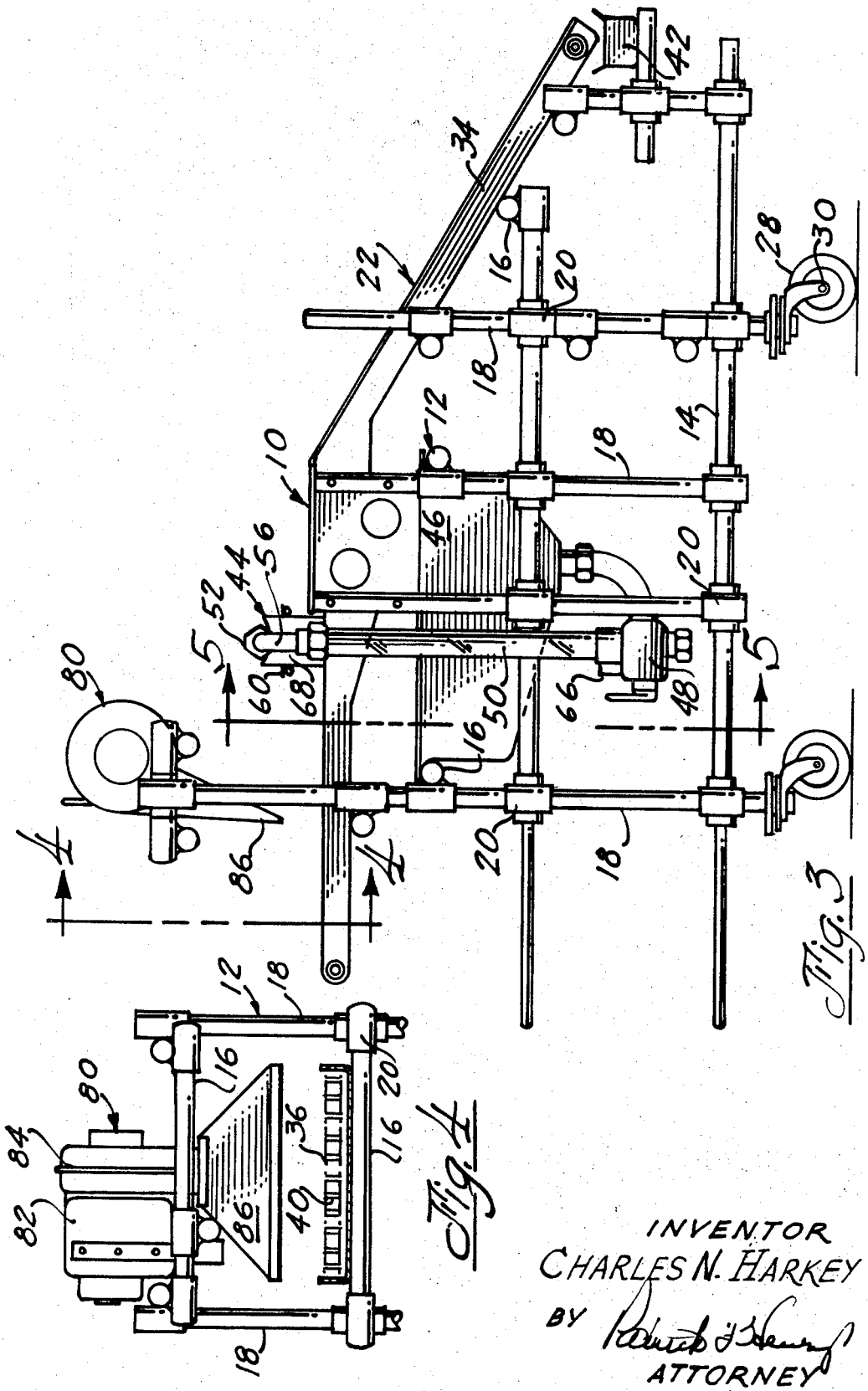

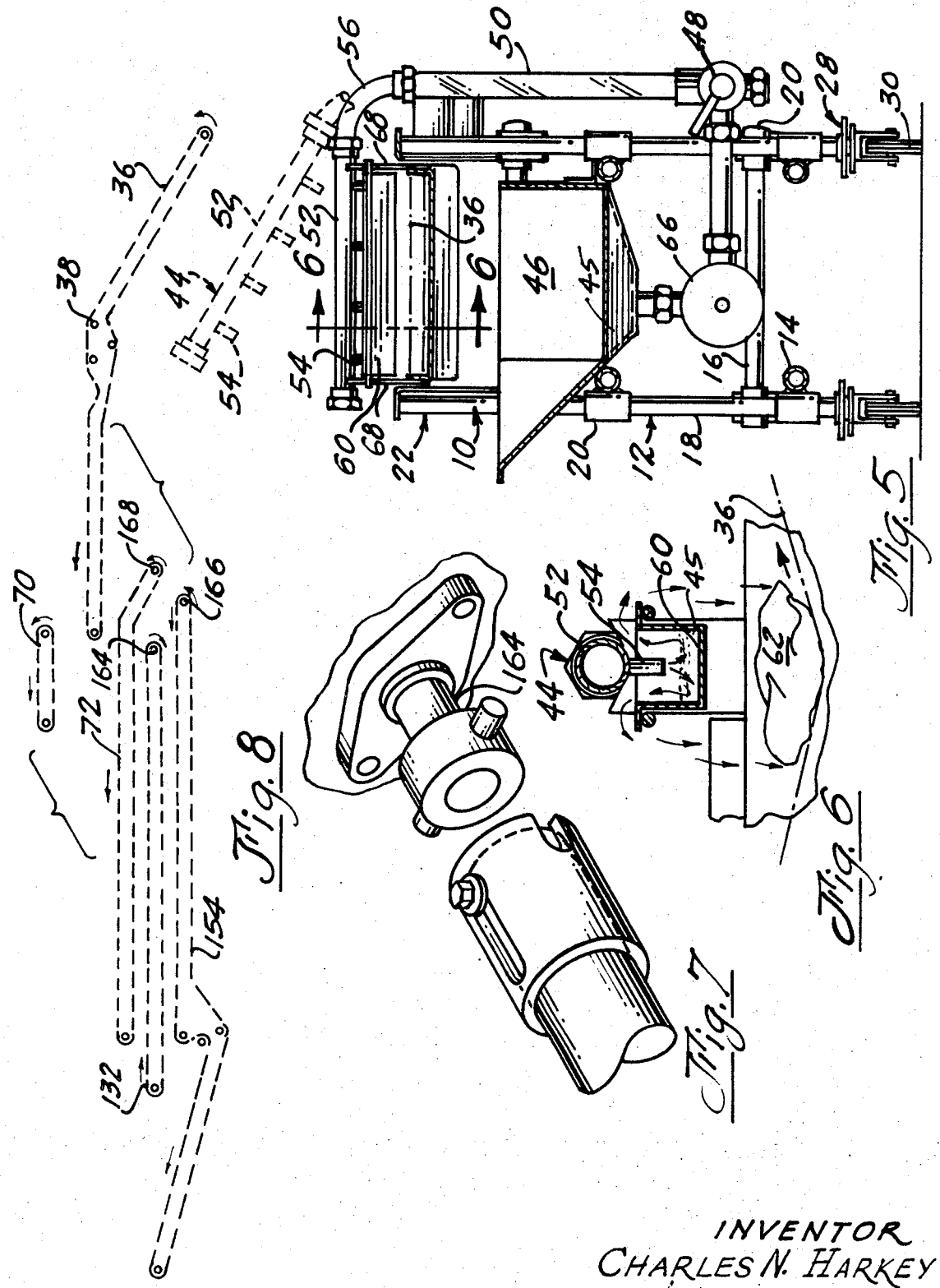

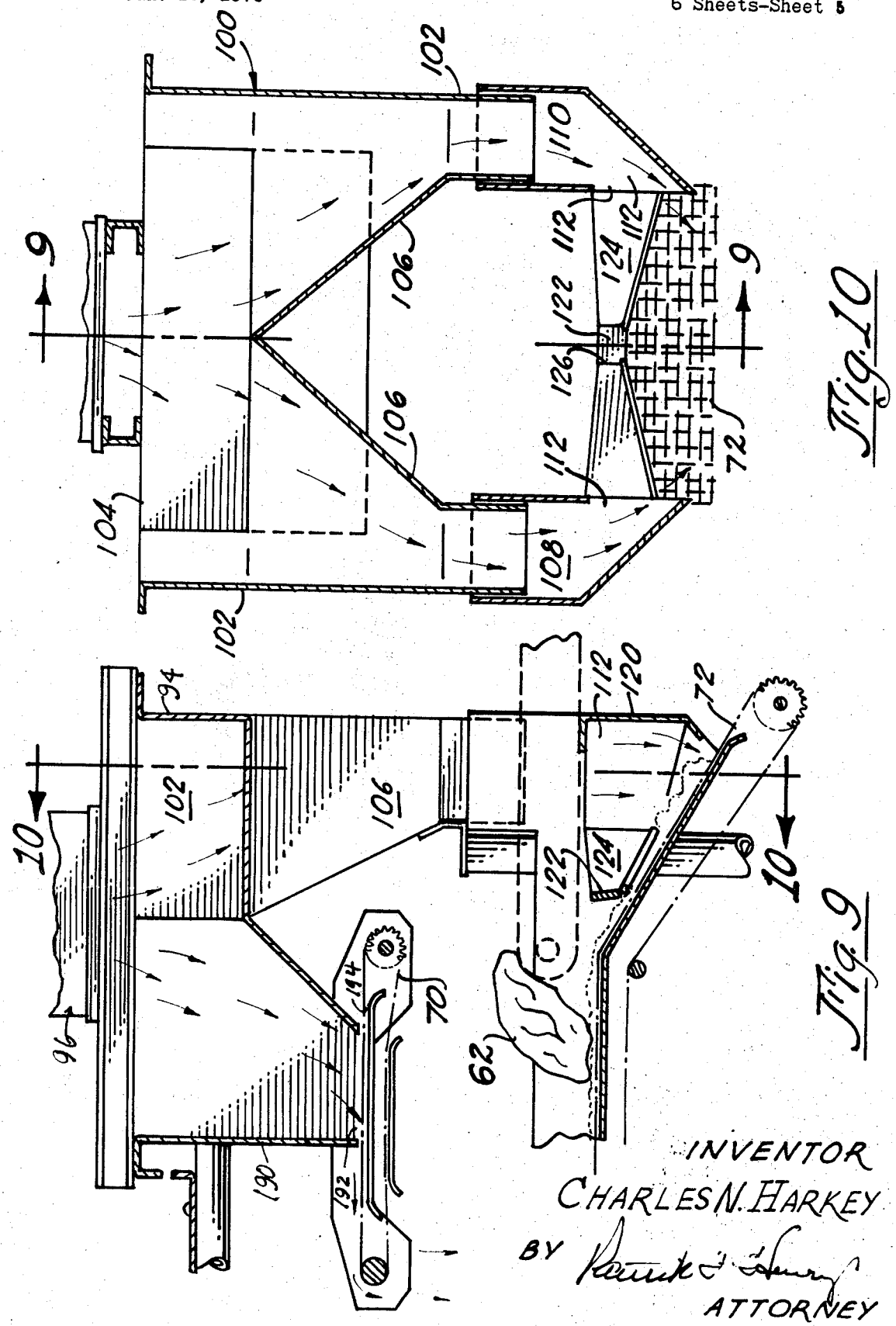

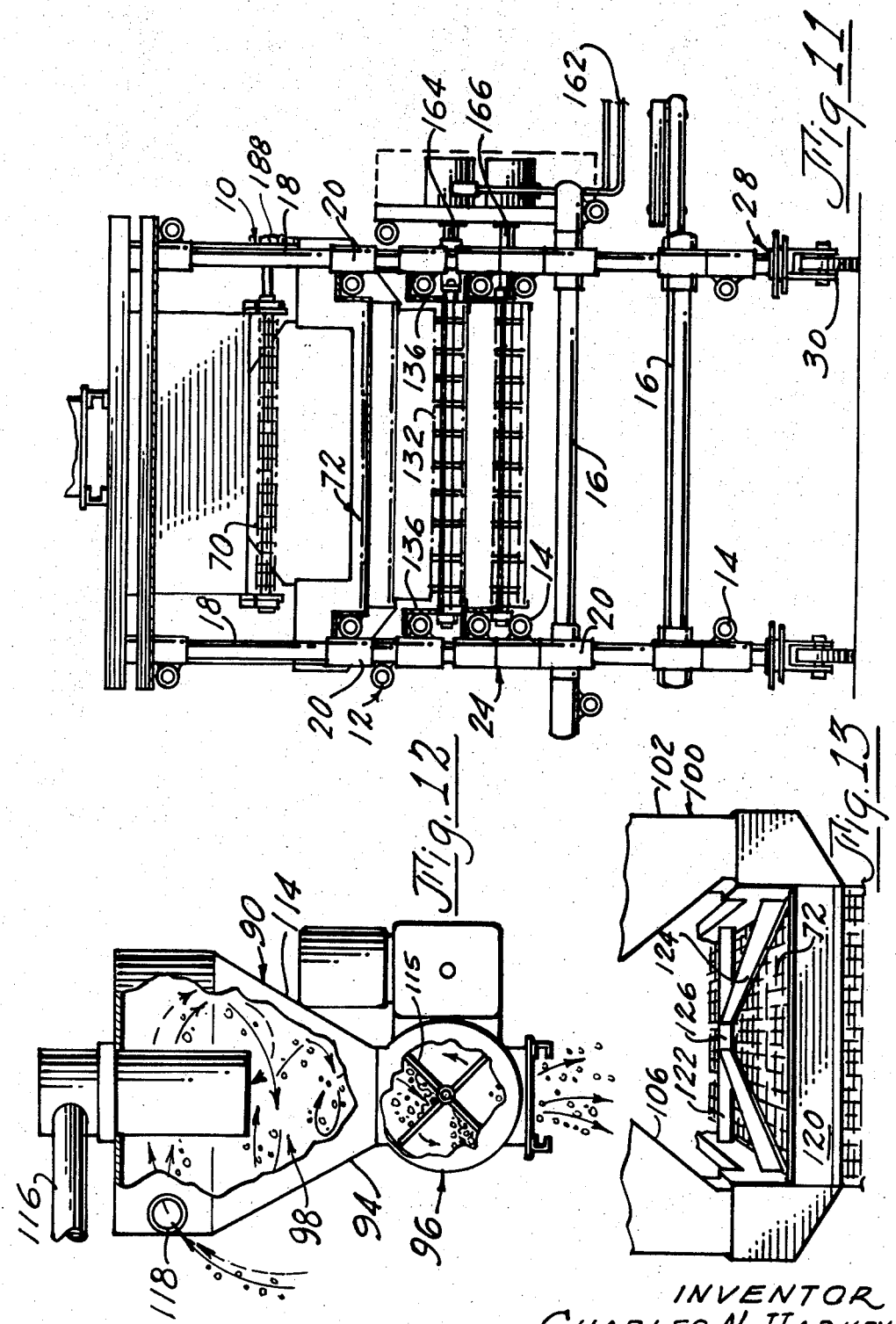

3,703,382
METHOD OF COATING EDIBLE FOOD ARTICLES
Charles N. Harkey, Gainesville, Ga., assignor to J. D. Jewell, Inc., Gainesville, Ga.
Filed Jan. 19, 1970, Ser. No. 3,911
Int. Cl. A23b 1/00
U.S. Cl. 99—169
12 Claims

ABSTRACT OF THE DISCLOSURE

A method and a machine for continuously applying a combination wet batter and dry breader coating to continuously moving individual pieces of food such as cut-up chicken parts, shrimp, etc. The machine has a batter unit and a breader unit. A batter unit infeed conveyor receives the individual food pieces to be battered and breaded and conveys them continuously through a wet batter bath which coats the individual food pieces with batter. The individual pieces then travel on continuously under a blower to strip off excess batter and smooth the product surface before the continuously traveling product is automatically drop transferred to a breading machine unit top conveyor which receives the product from the batter unit conveyor by a drop-transfer on to a bed of dry breader material created by a breader unit gravity flow hopper and spreader to coat the bottom of the product with dry breader. Next, the continuously traveling product travels under a hopper sifter-type conveyor to coat the top of the product with dry breader. The breader unit has three conveyors comprising stainless steel wire mesh belts running in opposite direction to the preceding conveyor placed under each other. A top conveyor drop transfers to a second (middle) conveyor with proper height spacing to cause the product to turn over (change sides) during the transfer. The same is repeated from the second (middle) conveyor to a third (bottom) conveyor. From the bottom conveyor, the product is dropped and turned onto a stainless steel wire mesh belt carry-out conveyor. The product is carried out and transferred to a packout conveyor while the dry breader falls through the same conveyor and through the wire mesh belt into a continuously traveling sifter then into a hopper. The dry breader is then transferred through vacuum pipe from the receiving hopper at the bottom of the machine back to the starting hopper on the top of the machine which completes a dry breader cycle of the breader recirculating system.

BACKGROUND OF THE INVENTION (1) Field of the invention

Method and machines for coating edible food products, especially machines for applying coatings to food.

(2) Description of the prior art

Conventional breading machines recirculate breading material by screw conveyors working horizontally and vertically in combination through a hopper for bed (bottom) and flow (top) to bread a product and do not successfully and continuously handle fine breading material with a particle size such as flour, or handle an oily breaded material regardless of particle size without packing and bogging down in the screw conveyor carry-trough enclosure requiring attention and maintenance. Also, any particle side breader material becomes damp by its constant recirculation contact with wet and frozen products at room temperature during the breading operation. After the breading material becomes damp, it does not free flow and does not properly coat a breaded product as a free-flowing dry bread of material does. All of these conditions are satisfactorily treated with the instant breading machine. A vacuum system keeps the breader dry by constantly removing moisture on every recirculation cycle, and any size particle breader material from dust to large crumb size recirculates either oiled or not oiled. Travel time is necessary to allow the breaded product to become set and bonded before it is handled. It would take three conventional breading machines working in a connecting series to give the product the result by the present machine and method by means of triple-tiered conveyor arrangement and keeping breader material dried by recirculation by vacuum regardless of particle size of all addition to the material. Contrary to some previous machines the product is transferred in the present machine and the batter unit wire conveyor to the breading unit conveyor without dripping wet batter onto the breader bed. On conventional breading machines, the transfer leaks batter into the breader material which dampens the material. This is eliminated on the present machines by the batter unit conveyor base being angled-up at the continuous return position to catch the drip and allow the wire belt returned to ride the base carrying the deposited dripped back into the unit batter supply tank for recirculation. On conventional breading machines the transfer of raw, fresh cut-up chicken parts and especially skin parts catch in the conveyors at the point of tangency whereas in the present machine provision is made to handle the transfer without this problem. It has been found desirable to create breader bed or breader materials one-half to one inch deep over the entire surface of the conveyor for the product to embed to coat the bottom of the product with breader material. Conventional breading machines utilize a pressure method of spreading breader to create a breader bedding which causes conditions to develop that require some attention and some conventional breading machines use gravity flow plus vibration on their hoppers to create a breader fall (similar to a water fall) to cover the top of the product and also, utilize a narrow opening which has a tendancy to bread-over causing flow difficulties. The present machine utilizes a wide opening across the width of the hopper bottom with a small conveyor to create the breader fall which has proved to be more trouble free during production. The utilization of the present machine of a means to cause a backward gravity fall and roll to the batter material on the up travel of a conveyor incline creates a continuous free flow breader bed over the entire conveyor surface.

SUMMARY OF THE INVENTION

The method and apparatus utilization of the vacuum system and a gravity flow recirculation to reduce unwanted moisture for handling the breader material. In starting, the gravity flow starting hopper feeds breading material to flow to make a breader bed and to create a breader fall on the top of the conveyor to coat the bottom and coat the top of the product being breaded and the gravity flow starting hopper receives the recirculated breaded material by gravity by fall from an air lock feeder which has received the recirculated breader material by vacuum pipe through a cyclone vacuum collector. The gravity flows starting hopper eliminates mechanical friction or pressure to reduce clogging. The breader material is caused to undergo a backward gravity fall enroll on the uptravel of the conveyor incline to create a continuously moving free flow breader bed, together with a continuous system to coat the top of the product and to eliminate dripping onto the breader material. A combination free hopper free flows breader material down to a sifter means in the form of a small open wire conveyor as the product is transferred from the batter unit wire conveyor belt to the breading top conveyor. The usual problem of leaking batter has been eliminated, as mentioned previously, by having the batter unit conveyor based angled-up at the continuous return position to catch the drip allowing the wire belt to return to the base carrying the deposited drippings back to the batter unit batter supply tank for recirculation. Better dry breading is supplied because instead of three conventional breading machine units or a very long conveyor working in a connected series the present machine utilizes a triple conveyor arrangement turning a product completely covered with a dried breading coat as it travels continuously from the batter unit to the breading unit automatically turning in a bed and flow of dried breader material three times and having a complete travel time through the three conveyors, at spaced intervals the breader coat becomes set and bonded at the product surface with a drying of breading coat which allows immediate handling without marring the surface of the product as it leaves the carryout conveyor. Thus, means is provided to keep the breader material dry including reduction of dripping and recirculation with air to dry the breader material. Conveyor means reduces the sticking and catching of chicken parts by use in one form of wide grooved plastic sprockets and open mesh chain conveyors.

BRIEF DESCRIPTION OF THE DRAWINGS

FIG. 1 is a perspective view of the entire machine.

FIG. 2 is a side elevation view of the machine shown in FIG. 1 with part of the length of the machine broken away and with dotted lines to illustrate an extension.

FIG. 3 is a side elevation view of the input into the machine shown in FIG. 1.

FIG. 4 is an end elevation view of the machine shown in FIG. 1 looking at the upper portion only in the direction of lines 4—4 in FIG. 3.

FIG. 5 is a cross-sectional view taken substantially along lines 5—5 in FIG. 3.

FIG. 6 is a cross-sectional view taken substantially along lines 6—6 in FIG. 5.

FIG. 7 is an enlarged view of a detachable drive coupling arrangement for the machine.

FIG. 8 is a diagrammatic side elevation view of the conveyor system of the machine shown in FIG. 1.

FIG. 9 is a cross-sectional view taken along line 9—9 in FIG. 10.

FIG. 10 is a cross-sectional view taken along line 10—10 in FIG. 9.

FIG. 11 is a cross-sectional elevation view of the output end of the machine in the direction of lines 11—11 in FIG. 2.

FIG. 12 is an elevation view of the airlock feeder and rotary feeder with parts thereof broken away.

FIG. 13 is a perspective view of a detail.

DESCRIPTION OF THE PREFERRED EMBODIMENT

In FIG. 1 the entire machine as designated by reference numeral 10 comprises a generally open machine frame designated generally by reference numeral 12 and which frame 12 is long compared with the width. The machine frame 12 is constructed from horizontal, vertical, and tranverse pipe members which are designated respectively as horizontal members 14, transverse members 16 and vertical members 18 connected together at various intersections by means of conventional aluminum cross-brackets 20 which serve as connectors and are provided with open sockets and suitable pressure set screws to bring the various members together rigidly in the relationship and the association shown in the drawings. While the machine may be assembled into one unitary long machine as shown in FIG. 1, it comprises two detachable sections which are the batter unit comprising the input section 22, and the main breading unit comprising the conveyor section 24.

Chicken parts placed or dropped on the conveyor in the input section 22 of the batter unit travel through the batter unit and breading unit section 24 and out on carry-out conveyor 26.

Each of the sections is mounted on several respective caster wheel assemblies 28 having caster wheels 30. Therefore, each of the sections 22, 24 may be detached and wheeled away from each others section 22, 24 for repair, cleaning, inspection or the like.

Input conveyor section 22 comprises side members 32, 34 providing a conveyor support frame for an open mesh stainless steel continuous belt conveyor 36 which travels inclined on a conveyor support shaft 38 on which are a plurality of toothed plastic conveyor pulleys or sprockets 40 which may be made of a plastic "Delrin."

A collector pan 42 is located near the entrance end of the conveyor 36 and a batter nozzle assembly 44 is located near the other end of conveyor 36 to dispense liquid batter material 45 which is pumped from a collection tub 46 through a valve 48 through a plastic hose 50 into a pipe manifold 52 having a plurality of nozzles 54 at spaced locations thereon and as shown on FIG. 5 being moveable by swinging same about a joint 56. The nozzles 54 emit batter material which as shown in FIG. 6 flows into a spill-over container 60 and out from opposite sides thereof as illustrated by the small arrowhead lines in FIG. 6 so that the batter represented by the arrowhead lines falls onto the piece of chicken 62 traveling on the conveyor 36. As seen in FIG. 5, the batter 45 in the tub 46 is pumped by means of a pump 66 through the valves 48 and through the nozzles 54. The spill-over pan 60 is supported on brackets 68 on opposite sides of the machine and may be readily removed for cleaning.

A small endless conveyor 70 above the conveyor 36 is made from stainless steel open wire mesh and is used for automatic application of breader-material on individual parts, chicken 62, put thereon.

From the end of conveyor 36 the chicken parts 62 fall on to the next conveyor designated generally by reference numeral 72 which is on the main breading section 24 and which comprises an endless belt stainless steel open mesh wire conveyor 74 which may be adjusted by means of conventional take up roller bearing assembly 78 on opposite sides of one end. Above the input end of the conveyor chain 36 is a blower apparatus 80 comprising a motor 82 and a blower 84 blowing air through a large transverse nozzle 86 onto the chicken parts coming from the nozzle arrangement 44 which has applied a liquid batter from the bucket 46 preparatory to breading the chicken parts and the liquid batter with a crumb or particle breading material such as bread crumbs, cracker crumbs or other edible crumb material selectively flavored or not.

Supported on the main breading section 24 above the conveyor 72 is the vacuum recirculation system designated generally by reference numeral 90 comprising a starting hopper 94, an airlock rotary feeder 96 and a "Cyclone" vacuum collector 98. (See also FIGS. 2 and 12.)

Beneath the starting hopper 94 is a distributor of crumbs comprising a stainless steel hopper 100 seen in FIGS. 9 and 10 which includes a main hopper body or housing constructed from stainless steel walls, there being sides 102, a top 104 and slanted bottom 106 defining respective side hopper outlets 108, 110 each having a respective crumb outlet 112 from which the breading crumbs are delivered onto the chicken parts carried by the conveyor 72.

As seen in FIGS. 1 and 2, above the stainless steel hopper 100 there is the air lock rotary feeder 96 which comprises a stainless steel housing 114 with a "Teflon" rotary 113. The "Cyclone" collector 98 is mounted on top of the airlock rotary feeder 96 and comprises the conical or toy top-shaped housing 114 having an air swirler 115 mounted therein which leads to an air exhaust pipe 116. Housing 114 has a breader material and air input line 118 leading therein to the housing top as shown in FIG. 12 and the breader material is whirled around by air from swirler 115 and delivered by the rotary feeder into the top of the hopper 104 from line 118. The breading material flows freely by gravity from the stainless steel hopper through the side hoppers 108 onto the conveyor 72, hoppers 108 and 110 are detachable from 100, 102, 106, etc. (see FIG. 10), for cleaning or repair. There is a breader material spreading arrangement 119 shown in FIG. 10 and FIG. 13 near the outlets 112 and conveyor 72 comprising a transverse housing 120 in close relationship connecting the breader material outlet 112 across conveyor 72. A tranverse strut 122 supported across the inside of the stainless steel hopper 100 supports one end of each of a pair of diagonal struts 124 having the ends connected at 126 to the strut 122 and the other ends connected to a point respectively on each side of the side hopper outlets 108, 110. The bottom of the struts 122, 124 and the housing 120 are in close proximity to the surface of the conveyor belt which carries the breader material under the struts 122, 124 arrangement to form a breader bed with the conveyor 72.

Referring to FIG. 1, beneath and spaced from conveyor 72 is another stainless steel open mesh chain continuous belt conveyor arrangement 130, having a conveyor open length mesh chain 132 mounted on a frame 134 having rigid side members 136. The conveyor is adjustable by means of conventional take-up roller bearing assemblies 78 the same as the other conveyors. Conveyor chain 132 travels in the direction opposite from conveyor 72 so that the chicken parts 62 fall from the end of the conveyor 72, flop and return in the opposite direction to receive additional breader material which is delivered from the uppermost assisting conveyor 70 which is a chain link, stainless steel open mesh conveyor belt 140 driven by chain 142 beneath the outlet 144 in the stainless steel hopper 100 which causes the breader material to be shifted and dropped through the conveyors whereby the chicken parts 62 traveling back on conveyor 132 receives additional breader material and upon reaching the end of conveyor chain 132 the chicken parts 62 drop into the lowermost conveyor 150 which carries the chicken parts 62 in the manner shown in FIG. 8 to the inclined outlet portion and to the output or terminal position 26. Conveyor 150 comprises a rigid frame 152 in the manner of the previous conveyors on which is mounted the stainless steel open wire mesh continuous belt conveyor 154 carrying the breaded chicken parts to be further processed or conveyed as desired.

The respective conveyors are driven respectively by hydraulic motors 160 receiving hydraulic fluid under pressure through hydraulic lines 162 and each hydraulic motor 160 drives a shaft 164, 166 and 168 respectively which drives a respective conveyor 72, 132, or 154, respectively, by means of the plastic sprockets 40.

The breader unit conveyor 72 operates by running the conveyor trains 74 stainless steel wire mesh belts over a stainless steel flat base sheet material 180 formed for the wire belt to run on and to house the dry breader and product being conveyed during the breading operation. This type of conveyor construction allows the breader being conveyed to reach a fall-through position near the discharge end of the conveyor belt whereby it drop-transfers and turns over (changes sides) onto the middle conveyor wire belt traveling in the opposite direction which carries the product under the flow of breader material from the top conveyor 72 fall-through position thereby again covering the product with dry breader material.

The same is repeated when the conveyed dry breader material and product breaded transfers to the bottom conveyor 150 from middle conveyor 130.

The above described conveyor construction and triple-tiered conveyor arrangement turns out a product completely covered with a dried breading coat automatically. The wet battered product traveling continuously from the input section batter unit 22 into the breader unit 24 is automatically turned in a bed and flow of dry breader material three times assuring a complete coating, and the travel time through the three conveyors and the three dry breader flows at spaced intervals allows the breading coat to have become set and bonded to the product surface, having a dry outer breading coat which allows immediate handling without marring the surface as the product leaves the carryout conveyor. This eliminates inspection and hand patch-up labor and is especially beneficial when chicken parts are breaded due to cavities, curves, contours and a generally loose rough surface.

It would take three conventional breading machine units working in a connected series to give the product the same conveyor travel time which allows the breaded product to become set and bonded before it is handled.

The breader material is kept dry by recirculation of dry breader material by vacuum regardless of particle size or oil addition to the material by means of: the "Cyclone" collector 98 an airlock feeder 96, vacuum chamber, vacuum pump (not shown) and vacuum filter working together causing the dry breader material to recirculate continuously by vacuum between a receiving hopper 184 at the bottom of the breading machine unit and the starting hopper 90 on top of the machine through pipe 118.

The gravity flow starting hopper 94 is filled with breader material which is continuously added there to during production as needed to replace that used in the breading process. The starting hopper 94 feeds breader material by gravity flow to make a breader bed and to create a breader fall (like a water fall) on the top conveyor 70 to coat the bottom and the top of the product being breaded which is a starter for breading operation and the breader material recirculation cycle.

In the recirculation cycle the gravity flow starting hopper 94 receives the circulated material by gravity fall from the air lock feeder 96 which has received the recirculated breader material by vacuum pipe air input line 118 through the cyclone vacuum collector 98 from the receiving hopper 184 which has received the circulated breader material from the breader conveyors 72, 132 and 154 which got the recirculated breader material from the starting hopper 94 in the recirculation cycle. The breader bed is to coat the bottom of the product being breaded. The gravity flow starting hopper 94 is important to the handling of fine particle breader material such as flour an oiled breader material because there is no mechanical friction or pressure to cause it to pack or clog in transfer from the gravity flow starting hopper 94 through gravity feed air vent shoots defined by the slanted bottoms 106 and the side hoppers 108, 110 which lead to the drag struts 124 and the gravity flow spreading arrangement shown in FIG. 13. The gravity flow of breader material through the gravity flow hopper 94 and the chutes defined by the hoppers 108, 110 onto the top conveyor 70 while belt surface of conveyor 72 places a breader material in position for the gravity spread arrangement shown in FIG. 13 including strut 122 and diagonal struts 124 and 126 located on the conveyor receiving incline to create the bread without friction or pressure. A breader bed typically is a breader material spread one-half to one inch deep over the entire surface of the conveyor for the product being breaded to inbed to coat the bottom of the product with breader material. Conventional breader machines have a pressure method of breading to create a breader bed which causes conditions that require more attention. The purpose of the breader fall is to coat the top of the product being breaded. Conventional breading machines use gravity flow plus vibration on the hoppers to create a breader fall similar to the water fall to cover the top of the product being breaded. However, as mentioned previously this has a tendency to clog or to form obstructions. The present machine eliminates this condition by means of the wide opening across the width of the hopper bottom 100 with a small conveyor 70 to create the breader fall to coat the top of the product.

The product is transferred from the batter unit wire conveyor 36 to breader unit top conveyor 72 without dripping wet batter onto the breader bed. On conventional breader machines this transfer leaks batter into the breader material which dampens the material. This is reduced in the present machine by the batter unit conveyor 36 being angled up at a continuous return position to catch the drip and allow the conveyor chain returned to ride the base carrying the deposited, dripped batter back into the batter unit batter supply tank pan 42 for recirculation to eliminate that problem.

It is difficult to convey raw fresh cut-up chicken parts because of loose flabby skin. On the present machine these are transferred without loose skin catching the conveyors at the point of tangency. The present machine has a turning shaft on the breader unit with plastic such as grooved, wide plastic collars working within 1/8" of the batter unit discharged into the conveyor to handle the transfer thereby eliminating the problem. The present machine will handle not only medium and large size material, such as flour or oil breader material, but other breader material. Sufficient conveyor travel time flow (change of side) during the travel provides an acceptable coated breaded product that can be handled immediately by the conveyor 26 without getting a breading built-up on the operator's hands. The arrangement of the machine permits the use of the standard roller bearings with perhaps a year longer life as opposed to some conventional breading machines which have to use special bearings that have a life expectancy of less than a week if the equipment operates continuously eight or more hours a day. The present machine is driven with hydraulic motors such as 160 directly connected to all driving shaft by its hydraulic system 162, etc., and the hydraulic pressure equipment is located from the machine in a dry place away from water, clean-up chemical and other things that are used. Most conventional breading machines are driven by electric motors, gear boxes and network of machine drives and provide a real maintenance problem where the equipment is cleaned with water, detergent and perhaps other chemicals daily in order to meet the requirements of the health laws or the Department of Agriculture. There is an unbelieveable cost in burned out electric motors which become wet during clean up and which cause a considerable amount of breakdown and inoperativeness of the machine.

The machine is easy to clean and to keep sanitary to meet the various requirement. For example:

(1) The frame may be all galvanized pipe and aluminum cross bracket construction which is round and easier to clean. There are no hard to clean corners and no places for hidden bacteria as in the case of some conventional machines.

(2) Conveyors may be made from stainless steel bodies and stainless steel wire belts, plastic sprockets and stainless steel shafts. The stainless steel body is formed like a shallow channel which has no cracks or crevices for breader material to lodge and to cause bacterial build up. Conventional breading machine conveyors have stainless steel bases bolted to angle and flat straps which allow breader material to settle into joints that can cause bacteria buildup.

(3) Where any part is connected to another in the present machine by means of bolt and nut that joint may be off-set by a stainless steel spacer 3/8" to 5/8" thick making a open joint that can be kept clean easily during the daily clean-up operation.

With reference to the struts 122, 124, and 126 and this arrangements shown in FIG. 13, and described previously, the arrangement of these struts 122, 124, 126 are at the proper height over the wire belt conveyor incline to cause a backward gravity fall and roll of the breader material from the up travel of the incline to create a continuous moving free-flow or breader bed over entire surface of conveyor 72.

The small wire conveyor belt 70 acts as a sifter and is driven continuously by a chain 188 from the corner conveyor power across top of the product being breaded with location at the forward position at the free flow starting hopper. Part of the hopper 100, generally associated with starting hopper 94 as shown in FIG. 9 defines a housing 190 which receives a recirculated breader material shown in the arrows moving into the direction of the sifter conveyor 70 through an outlet 192 in said housing 190 onto the sifter conveyor 70 which comprises a continuously moving endless stainless steel open mesh conveyor belt 194 in the manner of the construction of the other conveyors of the system. The conveyor 70 operates as a continuous system to coat the top of the product being breaded and is located in a forward position on the bottom of the free flow starting 100 which is part of the vacuum system to recirculate the breader material by means of the movement of the air.

While I have shown and described a particular apparatus which is capable of performing the methods and systems of my invention, this is by way of illustration only; and does not constitute the only machine or apparatus since various alterations, changes, omissions, additions, revisions, deviations and departures may be made in the method described and the machine and apparatus shown without departing from the scope of my invention as defined by interpretation of the appended claims.

What is claimed is:

1. In a method for coating edible food articles with a wet batter and a dry breading which may be made from bread crumbs or other material:
   (a) conveying said articles continuously on a conveyor means beneath a wet batter application means and depositing wet batter on said articles as same pass beneath said wet batter means,
   (b) collecting any wet batter which drips from said articles through openings in said conveyor means beneath the articles into a collector,
   (c) applying a breading material by gravity assisted by means of air flow causing said breading material to move and to float from above down upon the articles there below, and thereby moving said breading material prior to application whereby the breading material is treated in the air flow to remove at least some of the excess moisture.

2. The method claimed in claim 1 wherein said articles to be battered and breaded are directed up an incline prior to being conveyed beneath the batter means.

3. The method claimed in claim 1 wherein said breading material delivered is caused to engage a continuously moving sifter means and to direct at least some of breading material continuously along said sifting means in the direction of the movement of said articles to apply said breading material continuously for a distance as said articles move.

4. The method in claim 1 wherein said breading material is caused to fall through openings into a collector and introducing a negative pressure into said breading for said breading material to move upwardly, swirling said breading material to help dry same of any unwanted excess moisture picked up during a recirculation thereof and directing said breading material downwardly onto the articles therebelow.

5. The method claimed in claim 1 wherein breader material is dispersed upon the machine to receive the articles from the batter and a bed of dry breader material is created in continuous operation on the machine.

6. The method claimed in claim 1 wherein air is blown over the articles after receiving batter to strip off excess batter and to smooth the article surface to receive further processings.

7. The method claimed in claim 1: depositing breading material which is settled by gravity onto the top of the articles after the breading material is collected by a negative pressure agitated by the movement of air from the negative pressure and directed to be released for said gravity settling.

8. The method claimed in claim 1: engaging the breader material deposited on a conveyor with means at an angle for arranging said dry breader material into a continuously created bed of dry breader material.

9. The method claimed in claim 1 wherein said means for engaging a dry breader material is a member positioned at an angle with a space between said member and the conveyor to engage the dry breader material and arrange it into a more uniformed bed traveling on said conveyor.

10. The method in claim 6 including creating a breader fall continuously onto the articles moving thereunder.

11. The method in claim 3 wherein said breading material is caused to fall through openings into a collector, introducing a negative pressure into said breading for causing said breading material to move upwardly, swirling said breading material to help dry same of any unwanted excess moisture picked up during a recirculation thereof, and directing said breading material downwardly onto the articles therebelow.

12. The method in claim 11 wherein air is blown over the articles after receiving batter to strip off excess batter and to smooth the article surface to receive further processings.

References Cited

UNITED STATES PATENTS

| | | | |
|---|---|---|---|
| 2,731,942 | 1/1956 | Anderson | 118—16 |
| 2,865,766 | 12/1958 | Christianson et al. | 99—169 |
| 3,208,856 | 9/1965 | Luker | 99—107 |

HYMAN LORD, Primary Examiner

U.S. Cl. X.R.

99—166